Dec. 4, 1945.  H. BANY  2,390,345
AUTOMATIC CONTROL EQUIPMENT
Filed March 22, 1944     3 Sheets-Sheet 2

Inventor:
Herman Bany,
by Harry E. Dunham
His Attorney.

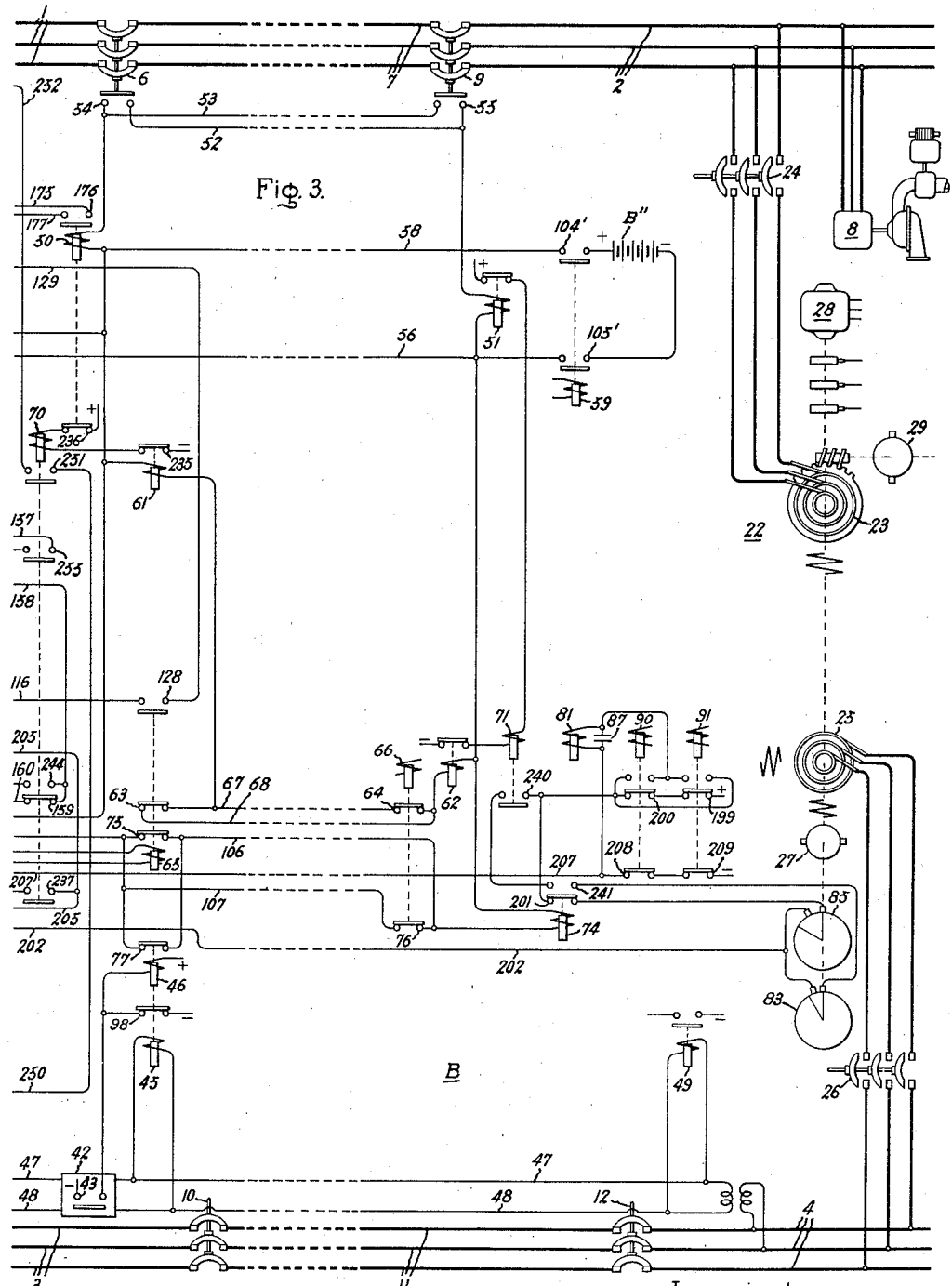

Patented Dec. 4, 1945

2,390,345

UNITED STATES PATENT OFFICE 2,390,345

AUTOMATIC CONTROL EQUIPMENT

Herman Bany, Lansdowne, Pa., assignor to General Electric Company, a corporation of New York Application March 22, 1944, Serial No. 527,637

20 Claims. (Cl. 171—123)

My invention relates to automatic control equipments and particularly to equipments for automatically synchronizing a synchronous frequency converter under different electric conditions of the two electric systems which are arranged to be interconnected by the converter.

One object of my invention is to provide an improved arrangement for controlling the relative frequencies of a synchronous frequency converter and one of the electric systems to which it is to be connected so as to establish a frequency difference and phase relation of the voltages existing between the converter and the system which will allow the converter to pull into step when it is connected to the system.

Another object of my invention is to provide an improved arrangement for synchronizing two synchronous frequency converters located in two substations at different points on an electric system, in such a manner that a minimum number of control wires is required between the two substations.

A further object of my invention is to provide an arrangement for automatically effecting the synchronization of a synchronous frequency converter to the two electric systems to which it is to be connected, in different ways depending upon the electric conditions of the two systems.

A still further object of my invention is to provide an arrangement for automatically synchronizing a synchronous converter in parallel with another synchronous converter in different ways depending upon whether or not the high and low frequency electric systems to which the converters are respectively connected are separate systems or are interconnected.

My invention will be better understood from the following description when taken in connection with the accompanying drawings, the three figures of which, when placed side by side, diagrammatically illustrate an electric system comprising a plurality of synchronous frequency converter control equipments embodying my invention.

Figure 1:
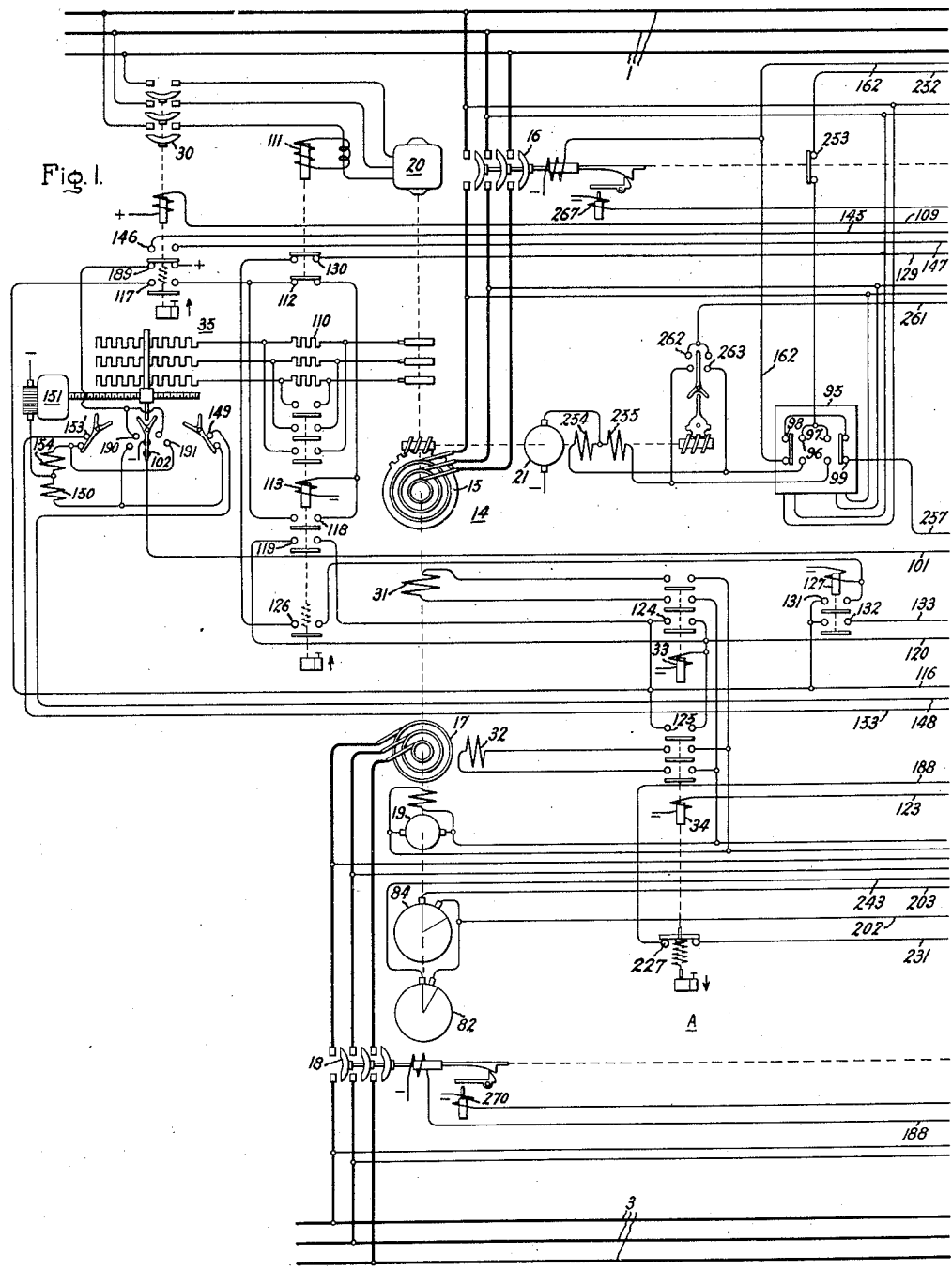
Figure 2:
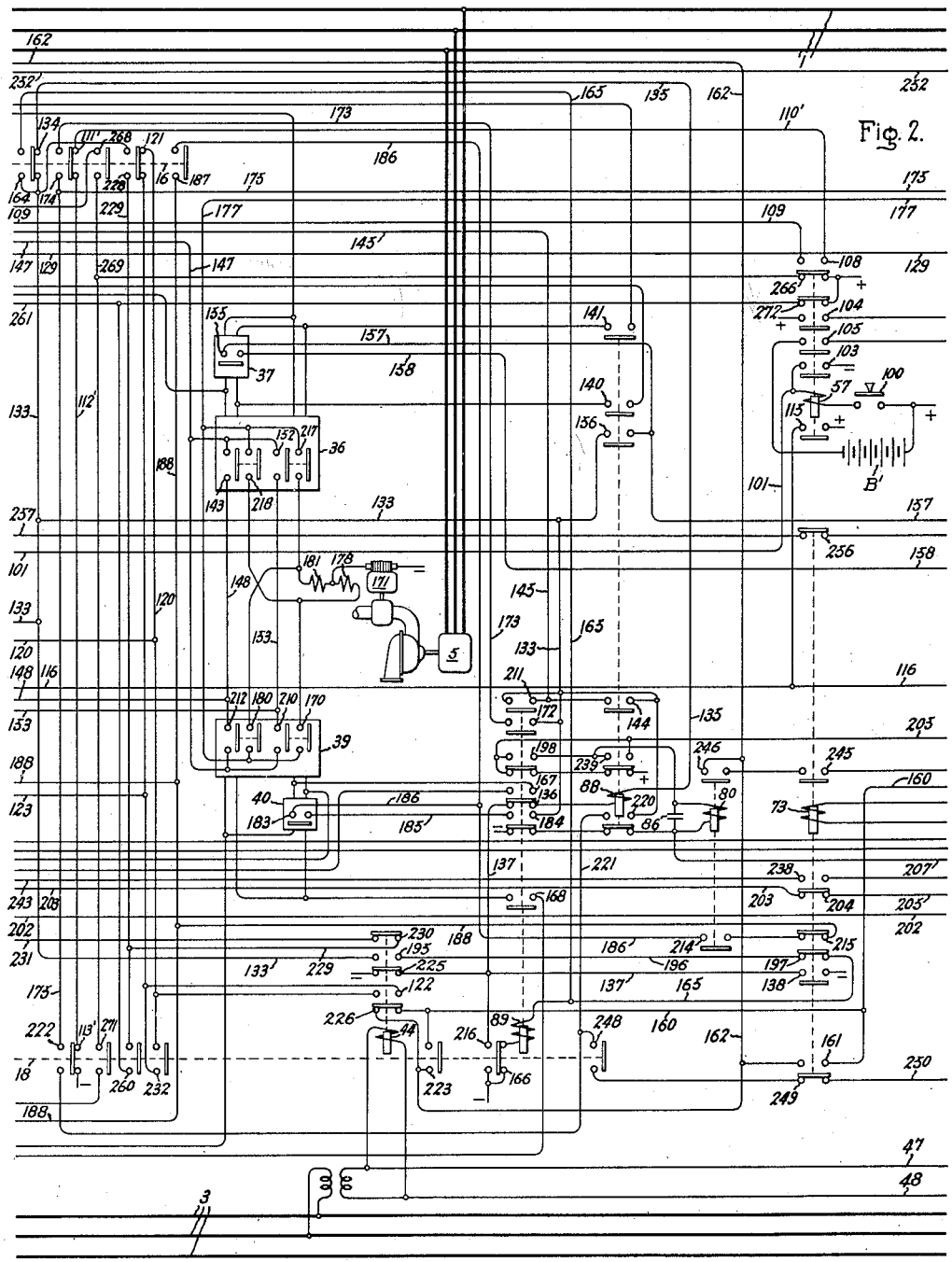

In the accompanying drawings, Figs. 1 and 2, and the left-hand portion of Fig. 3, diagrammatically illustrate the control apparatus for starting and synchronizing a synchronous frequency converter at one substation A of an electric system, and the right-hand portion of Fig. 3 diagrammatically illustrates a portion of similar control apparatus for starting and synchronizing a synchronous frequency converter at another substation B of the electric system. As shown, the two substations A and B are respectively located at different points of the electric system and have respectively the high frequency buses 1 and 2 and the low frequency buses 3 and 4. The high frequency bus 1 at the substation A is normally energized by a prime mover driven generator 5 and is arranged to be connected by means of a suitable switch 6 to a tie line 7. Similarly, the high frequency bus 2 at the substation B is normally energized by a prime mover driven generator 8 and is arranged to be connected by means of a suitable switch 9 to the tie line 7 so that when both of the switches 6 and 9 are simultaneously closed the high frequency buses 1 and 2 at the two stations are tied together.

The low frequency bus 3 at the substation A is arranged to be connected by means of a suitable switch 10 to a tie line 11, and the low frequency bus 4 at the substation B is arranged to be connected by means of a suitable switch 12 to the tie line 11 so that when both of switches 10 and 12 are simultaneously closed the buses 3 and 4 at the two stations are tied together. The buses 3 and 4 also are arranged to be supplied with electric energy from one or more other sources of current, not shown, and may or may not be interconnected by other means than the tie line 11.

At the substation A, the buses 1 and 3 are arranged to be interconnected by means of a synchronous frequency converter 14 comprising a high frequency synchronous machine 15 which is arranged to be connected to the high frequency bus 1 by means of a suitable circuit breaker 16 and a low frequency synchronous machine 17 which is arranged to be connected to the low frequency bus 3 by means of a suitable circuit breaker 18. The synchronous frequency converter 14 also is provided with a direct connected exciter 19 and a direct connected variable speed induction motor 20 for starting and varying the speed of the converter during the synchronization thereof. The converter 14 is also provided with a suitable frame shifting motor 21 for varying the position of the stator of one of the synchronous machines of the converter relative to the position of the stator of the other synchronous machine.

At the substation B, the buses 2 and 4 are arranged to be interconnected by means of a similar synchronous frequency converter 22 comprising a high frequency synchronous machine 23 which is arranged to be connected to the high frequency bus 2 by means of a suitable circuit breaker 24 and a low frequency synchronous machine 25 which is arranged to be connected to the low frequency bus 4 by means of a suitable circuit breaker 26. The synchronous converter 22 also is provided with a direct connected exciter 27, a variable speed induction motor 28 for starting and varying the speed of the converter while the converter is being synchronized, and with a frame shifting motor 29.

Since the control apparatus for each of the two converters is the same, I have shown in detail only the control apparatus for the converter 14 and have shown only that portion of a similar control apparatus for the converter 22 as is deemed necessary for a complete understanding of my invention.

When a converter is being placed in service, it is first started by connecting its starting motor to a suitable source of current and then controlling the speed of the starting motor so that one of the synchronous machines of the converter can be automatically synchronized with its associated bus. As will be pointed out later, when a converter is being placed in service the first synchronous machine thereof to be synchronized depends upon the electric conditions of the buses at the time that the converter is being started and whether or not the other converter is in service. After the first machine of a converter has been synchronized, the other machine is then synchronized in a manner depending also upon the electric condition of the buses.

When the synchronous converter 14 is being placed in service, a switch 30 is first closed to connect the starting motor 20 to the bus 1. Therefore, it will be observed that before the converter 14 can be started the associated high frequency bus 1 has to be energized by the associated generator 5. When the starting motor 20 has accelerated the converter 14 to a speed near the normal synchronous speed of the converter, the field windings 31 and 32 of the synchronous machines 15 and 17 respectively are connected to the exciter 19 by the field switches 33 and 34 so that the voltages of these machines build up to substantially their respective normal values.

If the other synchronous frequency converter 22 is not in service at the time the converter 14 is started, the high frequency machine 15 is the first synchronous machine of the converter 14 to be synchronized. This result is accomplished by automatically controlling the position of a motor operated rheostat 35 in the secondary circuit of the starting motor 20 in response to the difference in the frequencies of the synchronous machine 15 and the bus 1. Since such frequency difference responsive means are well known in the art and the details of such an arrangement form no part of my present invention, I have represented such means merely by a suitably labeled rectangle 36. My prior Patent 2,252,456, granted August 12, 1941, and assigned to the assignee of this application, discloses the details of a suitable speed control arrangement which may be used for controlling the speed of the starting motor 20 in the desired manner. As soon as the proper phase and frequency relation is established between the voltages of the high frequency synchronous machine 15 and the bus 1 by the speed control arrangement, a suitable automatic synchronizer 37 is arranged to effect the closing of the circuit breaker 16 so as to connect the synchronous machine 15 to the bus 1. One type of automatic synchronizer which may be used is disclosed in Letters Patent 2,009,097, granted July 23, 1935, on an application filed by H. T. Seeley and assigned to the same assignee as this application. Since the details of the automatic synchronizer 37 form no part of my present invention, I have represented the automatic synchronizer merely by a suitably labeled rectangle.

The closing of the circuit breaker 16 is arranged to effect the opening of the switch 30 so as to disconnect the starting motor 20 from the bus 1 and also to render the frequency responsive means 36 and the automatic synchronizer 37 inoperative. The closing of the circuit breaker 16 also renders operative a suitable frequency difference responsive means 39, which is similar to the frequency difference responsive means 36 except that it is responsive to the difference between the frequencies of the synchronous machine 17 and the bus 3. Also, the closing of the circuit breaker 16 renders operative a suitable automatic synchronizer 40 similar to the automatic synchronizer 37 except that it is responsive to the phase and frequency relation of the voltages of the synchronous machine 17 and the bus 3. The frequency difference responsive means 39 controls the speed of the prime mover driven generator 5 so as to establish the proper phase and frequency relation between the voltages of the synchronous machine 17 and the bus 3 to cause the automatic synchronizer 40 to operate and effect the closing of the circuit breaker 18 between the synchronous machine 17 and the bus 3.

If at the time the converter 14 is being placed in service the low frequency bus 3 is not energized, the synchronous machine 17 is synchronized in the following manner. After the circuit breaker 16 is closed to connect the synchronous machine 15 of the converter 14 to the bus 1, the field switch 34 is opened so as to disconnect the field winding 32 from the exciter 19, then the circuit breaker 18 is closed while the field winding 32 is deenergized, and then the field switch 34 is reclosed to again energize the field winding 32.

When a synchronous frequency converter is being connected in parallel with another frequency converter which is already in service, it is necessary in order to maintain the proper parallel operation of the two converters that the second machine to be placed in operation shall be synchronized only when there is a predetermined space relationship existing between all of the field poles of the two converters. In order to accomplish this result, I provide an arrangement of apparatus whereby the first machine of the second converter to be placed in service can be synchronized only when a predetermined space relationship exists between the rotors of that machine and the corresponding machine of the converter that is already in service. Furthermore, when a second converter is being started, the particular machine thereof that is synchronized first depends upon the electric condition of the buses. In the particular arrangement shown in the drawings, if the low frequency buses 3 and 4 are tied together when the second converter is being started, the low frequency machine thereof is synchronized first. If, however, only the high frequency buses 1 and 2 are tied together or neither the buses 1 and 2 nor the buses 3 and 4 are tied together, the high frequency machine of the second converter to be placed in service is synchronized first.

Therefore, if the converter 22 in the arrangement shown in the drawings is in service when the converter 14 is being placed in operation, the synchronous machine 17 is synchronized first if the buses 3 and 4 are tied together, but the synchronous machine 14 is synchronized first if only the high frequency buses 1 and 2 are tied together or the high frequency buses 1 and 2 and the low frequency buses are not respectively connected together. As a means for indicating that the buses 3 and 4 are tied together, I provide at one of the substations, which in the particular arrangement shown in the drawings is the substation A, a synchronism check relay 42 which is connected across corresponding phase conductors of the buses 3 and 4 and which is arranged to close its contacts 43 only when the frequencies of the two buses 3 and 4 are the same and the phase difference between corresponding voltages of these two buses is less than a predetermined value. Also, I provide at the substation A the voltage relays 44 and 45 which are respectively responsive to predetermined voltages of the buses 3 and 4. The relay 45, when energized, and the contacts 43 of the synchronism check relay 42 are respectively arranged to complete energizing circuits for a control relay 46, which when energized indicates that the buses 3 and 4 are electrically tied together either by the switches 10 and 12 and the tie line 11 or by some other means not shown. Furthermore, since an open circuit or a short circuit on the pilot wires 47 and 48, which connect the relays 43 and 45 at the substation A with the bus 4 at the substation B effects a deenergization of the voltage relay 45, the energization of the control relay 46 is also an indication that the pilot wires 47 and 48 are in normal operating condition.

For controlling the operation of the control apparatus at the substation B in accordance with the voltage of the bus 4, I provide a voltage relay 49 which is responsive to the voltage thereof. In order to indicate that the two high frequency buses 1 and 2 are tied together by the switches 6 and 9 and the tie line 7, I provide, at the substations A and B respectively, the control relays 50 and 51 which are both arranged to be energized when either converter is in operation and the buses 1 and 2 are not tied together. This result is accomplished by connecting the operating coils of these two relays 50 and 51 in series with the contacts 54 and 55, which are respectively closed when the switches 6 and 9 are open and which are connected in parallel by the pilot wires 52 and 53 which interconnect the two substations. At the substation A, the series circuit for the relays 50 and 51 is arranged to be completed across a battery B' by means of a pilot wire 56, which interconnects the two substations A and B and by the contacts 104 and 105 of a master relay 57, which is energized whenever the converter 14 is in operation. The circuit of the relays 50 and 51 is arranged to be connected across a battery B'' at the substation B by means of a pilot wire 58 which interconnects the two substations A and B and the contacts 104' and 105' of a master relay 59, which is energized when the converter 22 at the substation B is in operation.

For indicating that both of the converters are running at substantially synchronous speed, I provide at the substations A and B, respectively, the relays 61 and 62 which are both arranged to be energized when either of the converters is operating and the other is not operating. This result is accomplished by connecting across the pilot wires 56 and 58 the operating windings of the relays 61 and 62 in series with the parallel connected contacts 63 and 64 of the exciter voltage relays 65 and 66 at the substations A and B, respectively. The relay 65 is connected so as to be responsive to the voltage of the exciter 19 and is arranged to open its contacts 63 when the voltage of the exciter 19 is above a predetermined subnormal value. The relay 66 is similarly arranged so that it responds to the voltage of the exciter 27 and is arranged to open its contacts 64 when the voltage of the exciter 27 is above a predetermined subnormal value. The contacts 63 and 64 are connected in parallel by the pilot wires 67 and 68 which interconnect the two substations A and B. Since the voltages of the exciters 19 and 27 are high enough to effect the simultaneous opening of the contacts 63 and 64 only when both of the synchronous converters are in operation, it will be evident that the relays 61 and 62 are energized when only one of the converters is in operation.

When the relays 50 and 61 at the substation A are simultaneously deenergized, an energizing circuit is completed for a control relay 70. Therefore when the relay 70 is in its energized position it indicates that the high frequency buses 1 and 2 are tied together and that both of the converters are operating at substantially synchronous speed. The relays 51 and 62 at the substation B are arranged to complete an energizing circuit for a control relay 71 under similar conditions of the buses 1 and 2 and the converters 14 and 22.

For indicating that the low frequency buses 3 and 4 are tied together and both of the converters are operating, I provide the control relays 73 and 74 at the substations A and B, respectively, and connect the operating windings thereof and the parallel connected contacts 75, 76 and 77 of the relays 65, 66 and 46, respectively, in series across the pilot wires 56 and 58. Since the contacts 75 of the exciter voltage relay 65 are closed when the converter 14 is not in operation and the contacts 76 of the exciter voltage relay 66 are closed when the converter 22 is not in operation and the contacts 77 of the relay 46 are closed when the buses 3 and 4 are not tied together, it is evident that while any master relay is energized the relays 73 and 74 are deenergized only when the buses 3 and 4 are tied together and both of the converters 14 and 22 are also in operation.

For obtaining an indication that the rotors of the two converters 14 and 22 are in proper space relationship with respect to each other for synchronizing, I provide at the substation A a control relay 80 which, when the converter 14 is being started as the second machine, is arranged to be connected in series with the contact making devices 82 and 83 respectively mounted on the shafts of the converters 14 and 22 if the synchronous machine 15 is synchronized first, and in series with the contact making devices 84 and 85 also respectively mounted on the shafts of the converters 14 and 22 if the synchronous machine 17 is synchronized first. A similar relay 81 is provided at the substation B for indicating the proper space relationship of the rotors while the converter 22 is being started as the second machine. The contact making devices 82 to 85, inclusive, may be of any suitable construction whereby they respectively make contact when a predetermined portion of the rotor surface of the associated converter is passing a predetermined stationary point during each revolution of the rotor. The length of each contact depends upon the load angle and the polar arc of the associated machine. Since the high frequency machine of each converter has a larger number of poles than the low frequency machine, the pole pitch of the high frequency machine is less in mechanical degrees than the pole pitch of the low frequency machine. Consequently, the number of mechanical degrees during each revolution of the associated converter that the contacts 82 and 83 can make contact to effect the proper synchronization is less than the number of mechanical degrees the contact devices 84 and 85 can make contact. The condensers 86 and 87 are respectively connected in parallel with the operating windings of the relays 80 and 81 so that after these relays have picked up they remain in their picked-up positions for a sufficient length of time to complete the synchronizing operation initiated thereby.

In a manner which will be more fully described hereinafter, the relay 80 is arranged to be placed under the control of the contact making devices 82 and 83 during the synchronizing operation of the converter 14 when it is started as the second converter and the high frequency buses 1 and 2 are tied together electrically and the low frequency buses 3 and 4 are not tied together or are deenergized, and is arranged to be placed under the control of the contact making devices 84 and 85 during the synchronizing operation of the converter 14 when it is started as the second converter and the low frequency buses 3 and 4 are tied together. The circuit of the relay 80 also includes at the substation A the contacts 239 of a relay 88 which is so connected that it is arranged to be energized whenever the associated high frequency machine 15 is being synchronized and the contacts 198 of a relay 89 which is so connected that it is arranged to be energized when the associated low frequency machine 17 is being synchronized. At the substation B, the circuit of the relay 80 includes the contacts 208 of a relay 90 which is arranged to be energized only while the high frequency machine 23 is being synchronized and the contacts 209 of a relay 91 which is arranged to be energized only while the low frequency machine 25 is being synchronized. The order in which the relays 88 and 89 or 90 and 91 are energized while the associated converter is being placed in service depends upon the electric condition of the buses and whether or not the other converter is in service.

The relay 81 at the substation B is arranged to be connected in series with either the contact making devices 82 and 83 or the contact making devices 84 and 85 in a similar manner across the battery B' at substation A while the converter 22 is being started as the second converter.

The frame shifting means of each converter is normally maintained in its neutral position but is arranged to be operated to effect the synchronization of the associated high frequency machine when the associated converter is started while the other converter is in operation and both the high frequency buses 1 and 2 and the low frequency buses 3 and 4 are respectively tied together. The operation of the frame shifting motor 21 of the converter 14 under such electric conditions of the buses is controlled by a suitable phase responsive arrangement 95 which is connected to the high frequency synchronous machine 15 and the high frequency bus 1 so that the contacts 96 are closed to effect the movement of the frame shifting motor 21 in one direction in response to the voltage of the machine 15 leading the voltage of the bus 1, and the contacts 97 are closed to effect the movement of the frame shifting motor in the opposite direction in response to the voltage of the machine 15 lagging the voltage of the bus 1, and the contacts 98 and 99 are simultaneously closed, when the two voltages are substantially in phase. Since the details of such a phase responsive arrangement constitute no part of my present invention and furthermore are disclosed in detail in my prior Patent 2,004,776, granted June 11, 1935, and assigned to the assignee of this application, I have represented such a phase responsive arrangement 95 merely by a suitably labeled rectangle surrounding the contacts 96–99, inclusive.

The operation of the embodiment of my invention shown in the drawings will be described by describing only the operation of the control apparatus for the converter 14 at the substation A under different electric conditions of the buses 1 to 4, inclusive, and under different operating conditions of the other converter 22 since the control apparatus for the converter 22 at the substation B functions in a similar manner to synchronize the converter 22 under similar electric conditions of the buses 1 to 4, inclusive, and under similar operating conditions of the other converter 14.

*Buses 1 and 2 energized and not tied together; buses 3 and 4 energized and tied together; and no converter in operation*

It will be assumed first that the switches 6 and 9 are open so that the buses 1 and 2 are not connected together by the tie line 7 and that the switches 10 and 12 are closed so that the buses 3 and 4 are connected together by the tie line 11. Under such conditions, the voltage relays 44 and 45 are energized, and the contacts 43 of the synchronism check relay 42 are closed so that the control relay 46 is also energized.

When it is desired to place the converter 14 in service, an associated manually controlled start switch 100 is closed to complete an energizing circuit for the associated master relay 57 from the positive terminal of the battery B' through the contacts of the start switch 100, winding of the master relay 57, conductor 101, contacts 102 on the motor operated rheostat 35 which are closed only when the rheostat is in a predetermined starting position, to the negative terminal of the battery B'. The closing of the contacts 103 of the master relay 57 completes a shunt circuit around the contacts 102 of the rheostat 35. The contacts 104 and 105 of the master relay 57 respectively connect the pilot wires 58 and 56 to the positive and negative terminals of the battery B' so that the relays 50 and 51 are energized since the auxiliary contacts 54 and 55 on the switches 6 and 9 respectively are closed. The closing of the contacts 104 and 105 of the relay 57 also completes an energizing circuit for the relays 61 and 62 through the pilot wires 67 and 68 in parallel, and an energizing circuit for the control relays 73 and 74 through the pilot wire 106 and the series connected contacts 75 of the relay 65 and also through the pilot wire 107 and the contacts 76 of the relay 66.

The closing of the contacts 108 of the master relay 57 completes an energizing circuit for the operating winding of the starting switch 30 for the starting motor 20 from the positive terminal of the battery B' through the operating winding of the switch 30, conductor 109, contacts 108 of relay 57, conductor 110', contacts 111' on circuit breaker 16, conductor 112', contacts 113' on circuit breaker 18 to the negative terminal of the battery B'. The closing of the switch 30 connects the primary winding of the starting motor 20 to the bus 1. At the instant of starting, the secondary circuit of the motor 20 includes a starting resistor 110 and the adjustable rheostat 35. As soon as the switch 30 closes, the starting motor 20 immediately starts to accelerate the rotor of the converter 14 and the starting current through the primary winding of the starting motor 20 is sufficient to cause the current relay 111 in the primary circuit of the motor to open its contacts 112 and maintain them open until the converter 14 has been accelerated to approximately its synchronous speed. When the contacts 112 are reclosed in response to the converter reaching substantially synchronous speed, an energizing circuit is completed for the operating coil of a suitable switch 113 to short circuit the starting secondary resistance 110. This energizing circuit is from the positive terminal of the battery B' through the contacts 115 of master relay 57, conductor 116, contacts 117 which are arranged to be closed, a predetermined time after the switch 30 closes, contacts 112 of the current relay 111, operating winding of switch 113 to the negative terminal of battery B'. The closing of the auxiliary contacts 118 of the switch 113 completes a shunt circuit around the contacts 112 of the current relay 111. The closing of the auxiliary contacts 119 of the switch 113 completes an energizing circuit for the operating windings of the field switches 33 and 34 to connect the field windings 31 and 32 of the synchronous machines 15 and 17, respectively, to the exciter 19. The energizing circuit for the operating winding of the field switch 33 is from the positive terminal of the battery B' through contacts 115 of relay 57, conductor 116, contacts 119 of switch 113, conductor 120, winding of field switch 33 to the negative terminal of the battery B'. The energizing circuit for the winding of the field switch 34 is from the positive terminal of the battery B' through contacts 115 of relay 57, conductor 116, contacts 119 of switch 113, conductor 120, auxiliary contacts 121 on circuit breaker 16 in parallel with contacts 122 of relay 44, conductor 123, winding of field switch 34 to the negative terminal of battery B'. The closing of the auxiliary contacts 124 of the field switch 33 and of the auxiliary contacts 125 of the field switch 34 completes shunt circuits around the contacts 119 of switch 113.

The closing of the time delay contacts 126 of the switch 113, which closes a predetermined time after the main contacts of the switch are closed, completes an energizing circuit for the control relay 127 if at the same time the voltage of the exciter 19 has built up to a sufficient value to effect the operation of the voltage relay 65. This energizing circuit for the control relay 127 is from the positive terminal of the battery B' through contacts 115 of relay 57, conductor 116, contacts 128 of relay 65, conductor 129, contacts 130 of current relay 111, time delay contacts 126 of switch 113, winding of relay 127 to the negative terminal of battery B'. The closing of the contacts 131 of the relay 127 completes a locking circuit for the relay from conductor 116 directly to the winding of the relay.

Since the relay 73 is energized during the entire starting operation of the connection 14 under the assumed electric conditions of the buses, the closing of the contacts 132 of the relay 127 completes an energizing circuit for the control relay 88 from the positive terminal of the battery B' through contacts 115 of relay 57, conductor 116, contacts 132 of relay 127, conductor 133, auxiliary contacts 134 on circuit breaker 16, conductor 135, winding of relay 88, contacts 136 of relay 89, conductor 137, contacts 138 of relay 73 to the negative terminal of the battery B'.

The closing of the contacts 140 and 141 of the relay 88 renders the frequency difference responsive means 36 and the automatic synchronizer 37 operative by connecting them to the bus 1 and to the synchronous machine 15. If the frequency of the synchronous machine 15 is below the frequency of the bus 1 more than a predetermined amount, the frequency difference responsive means 36 closes its contacts 143 and completes a circuit for the motor 151 of the motor operated rheostat 35 from the positive terminal of the battery B' through contacts 115 of relay 57, conductor 116, contacts 132 of relay 127, conductor 133, contacts 144 of relay 88, conductor 145, contacts 146 of starting switch 30, conductor 147, contacts 143 of frequency difference responsive means 36, conductor 148, limit switch 149 on rheostat 35, field winding 150 and armature winding of motor 151 to the negative terminal of the battery B'. This energizing circuit causes the motor 151 to operate in a direction to decrease the amount of resistance in the secondary circuit of the starting motor 20 so as to increase the speed thereof and the frequency of the synchronous machine 15. If the frequency of the synchronous machine 15 is above the frequency of the bus 1, or is less than the bus frequency but the frequency difference is below a predetermined value, the frequency difference responsive means 36 closes its contacts 152 and completes an energizing circuit for the motor 151 of the motor operated rheostat 35 from the positive terminal of the battery B' through contacts 115 of relay 57, conductor 116, contacts 132 of relay 127, conductor 133, contacts 144 of relay 88, conductor 145, contacts 146 of starting switch 30, conductor 147, contacts 152 of frequency difference responsive means 36, conductor 153, limit switch 153' of rheostat 35, field winding 154 and armature winding of motor 151 to the negative terminal of battery B'. This energizing circuit causes the motor 151 to operate in a direction to increase the amount of resistance in the secondary circuit of the motor 20 so as to decrease the speed thereof and the frequency of the synchronous machine 15.

When the difference between the frequencies of the synchronous machine 15 and the bus 1 is less than a predetermined value and a predetermined phase relation also exists between the voltages of the synchronous machine 15 and the bus 1, the automatic synchronizer 37 closes its contacts 155 and completes an energizing circuit for the closing coil of the circuit breaker 16 so as to connect the synchronous machine 15 to the bus 1. The energizing circuit for the closing coil of the circuit breaker 16 is from the positive terminal of the battery B' through contacts 115 of relay 57, conductor 116, contacts 132 of relay 127, conductor 133, contacts 156 of relay 88, conductor 157, contacts 155 of automatic synchronizer 37, conductor 158, contacts 159 of relay 70 (which is deenergized because relays 50 and 61 are energized under the assumed electric conditions), conductor 160, contacts 161 of relay 73, conductor 162, closing coil of circuit breaker 16 to the negative terminal of batery B'.

The opening of the auxiliary contacts 111' on the circuit breaker 16 interrupts the heretofore described energizing circuit for the operating coil of the starting motor switch 30 so that this switch is opened to disconnect the starting motor 20 from the bus 1. The opening of the auxiliary contacts 117 on the switch 30 effects the opening of the short circuiting switch 113 so that the starting resistor 110 is reconnected in series with the secondary winding of the starting motor 20. The closing of the auxiliary contacts 189 on the switch 30 completes a circuit for the motor 151 of the motor operated rheostat 35 through either the limit switch 190 and the field winding 150 in series or the limit switch 191 and the field winding 154 in series, depending upon the position of the movable arm of the rheostat 35 so that the rheostat is restored to its normal starting position, in which position the contacts 102 are closed.

The opening of the auxiliary contacts 134 on the circuit breaker 16 interrupts the heretofore described energizing circuit of the relay 88 so that it becomes de-energized, and by opening its contacts 140 and 141, the relay 88 renders the frequency difference responsive means 36 and the automatic synchronizer 37 inoperative. The closing of the auxiliary contacts 164 on the circuit breaker 16 completes an energizing circuit for the control relay 89 from the positive terminal of the battery B' through contacts 115 of relay 57, conductor 116, contacts 132 of relay 127, conductor 133, auxiliary contacts 164 on circuit breaker 16, conductor 165, winding of relay 89, auxiliary contacts 166 on circuit breaker 18 to the negative terminal of the battery B'.

The closing of the contacts 167 and 168 of relay 89 renders the frequency difference responsive means 39 and the automatic synchronizer 40 operative by connecting them to the synchronous machine 17 and to the bus 3. If the frequency of the synchronous machine 17 is higher than the frequency of the bus 3 or is lower than this bus frequency, but the frequency difference is less than a predetermined value, the frequency difference responsive means 39 closes its contacts 170 and completes an energizing circuit for a prime mover governing motor 171 so that it effects a decrease in the frequency of the synchronous machine 17 by decreasing the frequency of the bus 1. This energizing circuit for the motor 171 is from the positive terminal of the battery B' through contacts 115 of relay 57, conductor 116, contacts 132 of relay 127, conductor 133, contacts 172 of relay 89, conductor 173, auxiliary contacts 174 on circuit breaker 16, conductor 175, contacts 176 of relay 50, conductor 177, contacts 170 of frequency difference responsive means 39, field winding 178 and armature winding of motor 171 to the negative terminal of the battery B'.

If the frequency of the machine 17 is lower than the frequency of the bus 3 by more than a predetermined amount, the frequency difference responsive means 39 closes its contacts 180 and completes an energizing circuit for the prime mover governing motor 171 so that it effects an increase in the frequency of the machine 17 by increasing the frequency of the bus 1. This operating circuit for the motor 171 is from the positive terminal of the battery B' to conductor 177 in the manner heretofore described, then through contacts 180 of frequency difference responsive means 39, field winding 181 and armature winding of motor 171 to the negative terminal of the battery B'.

When the proper phase and frequency difference relations have been established between the voltages of the synchronous machine 17 and the bus 3 in response to the operation of the frequency difference responsive means 39, the automatic synchronizer 40 closes its contacts 183 and completes an energizing circuit for the closing coil of the circuit breaker 18 so that the synchronous machine 17 is connected to the bus 3. The energizing circuit for the closing coil of the circuit breaker 18 is from the positive terminal of the battery B' through contacts 115 of relay 57, conductor 116, contacts 132 of relay 127, conductor 133, contacts 184 of relay 89, conductor 185, contacts 183 of automatic synchronizer 40, conductor 186, auxiliary contacts 187 on circuit breaker 16, conductor 188, closing coil of circuit breaker 18 to the negative terminal of the battery B'.

The opening of the auxiliary contacts 166 on the circuit breaker 18 interrupts the heretofore described circuit for the control relay 89, which in turn by opening its contacts 167 and 168 renders the frequency difference responsive means 39 and the automatic synchronizer 40 inoperative to control the prime mover governing motor 171.

*Buses 1 and 2 energized and not tied together; Buses 3 and 4 energized and tied together; and one converter in operation*

It will now be assumed that when the converter 14 is being placed in operation that the switches 6 and 9 are open so that only the buses 3 and 4 are tied together and that the converter 22 has been interconnected between the buses 2 and 4. The closing of the start switch 100 effects, in the manner heretofore described, the connection of the starting motor 20 to the bus 1 and the acceleration of the converter 14 to approximately synchronous speed and the energization of the exciter voltage relay 65. Since under the assumed electric conditions the contacts 76 of the exciter voltage relay 66 at the substation B are open and also the contacts 77 of the control relay 46 are open, the opening of the contacts 75 of the exciter voltage relay 65 at the substation A effects the denergization of the relays 73 and 74 so that when the relay 127 becomes energized in response to the converter 14 reaching substantially synchronous speed, a circuit is completed for the control relay 89 from the positive terminal of the battery B' through contacts 115 of relay 57, conductor 116, contacts 132 of relay 127, conductor 133, contacts 195 of voltage relay 44, conductor 196, contacts 197 of relay 73, conductor 165, winding of relay 89, auxiliary contacts 166 on circuit breaker 18 to the negative terminal of battery B'.

The closing of the contacts 198 of the relay 89 completes an energizing circuit for the relay 80 from the positive terminal of the battery B'' at the substation B through contacts 199 of relay 91, contacts 200 of relay 90, contacts 201 of relay 74, contact making device 85, pilot wire 202, contact making device 84 at substation A, conductor 203, contacts 204 of relay 73, conductor 205, contacts 198 of relay 89, winding of relay 80 and condenser 86 in parallel, pilot wire 207, contacts 208 of relay 90 at substation B'', contacts 209 of relay 91 to the negative terminal of the battery B''. The relay 80 therefore can be energized only when the positions of the rotors of the converters 14 and 22 are such as to effect the simultaneous closing of the contacts of the contact making devices 84 and 85.

The closing of the contacts 167 and 168 of the relay 89 renders the frequency difference responsive means 39 and the automatic synchronizer 40 operative by connecting them to the synchronous machine 17 and the bus 3. If the frequency of the machine 17 is higher than the frequency of the bus 3 or is lower than this bus frequency, but the frequency difference is less than a predetermined value, the frequency difference responsive means 39 closes its contacts 210 and completes an operating circuit for the rheostat motor 151 so as to increase the secondary resistance of the motor 20 and thereby effect a decrease in the speed of the converter 14. This operating circuit for the motor 151 is from the positive terminal of the battery B' through contacts 115 of relay 57, conductor 116, contacts 132 of relay 127, conductor 133, contacts 211 of relay 89, conductor 145, auxiliary contacts 146 on starting switch 30, conductor 147, contacts 210 of frequency difference responsive means 39, conductor 153, limit switch 153' on rheostat 35, field winding 154 and armature winding of motor 151 to the negative terminal of battery B'.

If the frequency of the synchronous machine 17 is below the frequency of the bus 3 more than a predetermined amount, the frequency difference responsive means 39 closes its contacts 212 and completes an operating circuit for the rheostat motor 151 so as to decrease the secondary resistance of the motor 20 and thereby effect an increase in the speed of the converter 14. This operating circuit for the motor 151 is from the positive terminal of the battery B' to the conductor 147 in the manner just described, then through contacts 212 of frequency difference responsive means 39, conductor 148, limit switch 149 on rheostat 35, field winding 150 and armature winding of motor 151 to the negative terminal of battery B'.

When the proper space relationship exists between the rotors of the two converters 14 and 22 so that the relay 80 is energized at the same time a predetermined phase and frequency difference relationship exists between the voltages of the synchronous machine 17 and the bus 3 so that the contacts 183 of the automatic synchronizer 40 are closed, an energizing circuit is completed for the closing coil of the circuit breaker 18 so that the synchronous machine 17 is connected to the bus 3. This energizing circuit for the closing coil of the circuit breaker 18 is from the positive terminal of the battery B' through contacts 115 of relay 57, conductor 116, contacts 132 of relay 127, conductor 133, contacts 184 of relay 89, conductor 185, contacts 183 of automatic synchronizer 40, conductor 186, contacts 214 of relay 80, contacts 215 of relay 73, conductor 188, closing coil of circuit breaker 18 to the negative terminal of battery B'.

The opening of the auxiliary contacts 166 on the circuit breaker 18 interrupts the energizing circuit of the control relay 89, which in turn by opening its contacts 167 and 168 renders the frequency difference responsive means 39 and the automatic synchronizer 40 inoperative. The closing of the contacts 136 of the control relay 89 completes an energizing circuit for the control relay 88 from the positive terminal of the battery B' through contacts 115 of relay 57, conductor 116, contacts 132 of relay 127, conductor 133, auxiliary contacts 134 on circuit breaker 16, conductor 135, winding of relay 88, contacts 136 of relay 89, conductor 137, auxiliary contacts 216 on circuit breaker 18 to the negative terminal of battery B'.

The closing of the contacts 140 and 141 of relay 88 renders the frequency difference responsive means 36 and the automatic synchronizer 37 operative by connecting them to the synchronous machine 15 and to the bus 1. If the frequency of the synchronous machine 15 is higher than the frequency of the bus 1 or is lower than this bus frequency, but the frequency difference is less than a predetermined value, the frequency difference responsive means 36 closes its contacts 217 and completes an energizing circuit for the prime mover governing motor 171 so that it effects an increase in the frequency of the bus 1. This energizing circuit for the motor 171 is from the positive terminal of the battery B' through contacts 115 of relay 57, conductor 116, contacts 132 of relay 127, conductor 133, contacts 220 of relay 88, conductor 221, auxiliary contacts 222 on circuit breaker 18, conductor 175, contacts 176 of relay 50, conductor 177, contacts 217 of frequency difference responsive means 36, field winding 181 and armature winding of motor 171 to the negative terminal of battery B'.

If the frequency of the machine 15 is lower than the frequency of the bus 1 by more than a predetermined amount, the frequency difference responsive means 36 closes its contacts 218 and completes an operating circuit for the prime mover governing motor 171 so that it effects a decrease in the frequency of the bus 1. This operating circuit for the motor 171 is from the positive terminal of the battery B' to conductor 177 in the manner just described, then through contacts 218 of frequency difference responsive means 36, field winding 178 and armature winding of motor 171 to the negative terminal of battery B'.

When the proper phase and frequency difference relations have been established between the voltages of the synchronous machine 15 and the bus 1 in response to the operation of the frequency difference responsive means 36, the automatic synchronizer 37 closes its contacts 155 and completes an energizing circuit for the closing coil of circuit breaker 16 so that the synchronous machine 15 is connected to the bus 1. This energizing circuit for the closing coil of the circuit breaker 16 is from the positive terminal of the battery B' through contacts 115 of relay 57, conductor 116, contacts 132 of relay 127, conductor 133, contacts 156 of relay 88, conductor 157, contacts 155 of automatic synchronizer 37, conductor 158, contacts 159 of relay 70, conductor 160, auxiliary contacts 223 on circuit breaker 18, conductor 162, closing coil of circuit breaker to the negative terminal of the battery B'.

The opening of the auxiliary contacts 134 on the circuit breaker 16 interrupts the heretofore described circuit for the control relay 88, which in turn by opening its contacts 140 and 141 renders the frequency difference responsive means 36 and the automatic synchronizer 37 inoperative to control the prime mover governing motor 171.

*Buses 1 and 2 energized and not tied together; and buses 3 and 4 energized and not tied together*

It will now be assumed that when the converter 14 is being started not only are the switches 6 and 9 open so that the buses 1 and 2 are not tied together, but also that the buses 3 and 4 are separately energized and are neither tied together nor in synchronism so that the contacts 43 of the synchronism check relay 42 are open and, therefore, the relay 46 is deenergized and its contacts 77 are closed.

Whether or not the converter 22 is in service when the converter 14 is started under the above-mentioned electric conditions of the buses, the control apparatus operates in the same manner as heretofore described in connection with the starting of the converter 14 when only the energized buses 3 and 4 are tied together, since under the assumed conditions the energizing circuit for the control relay 73 remains completed through contacts 77 of relay 46 after the exciter voltage relay 65 opens its contacts 75 in response to the exciter voltage building up to a predetermined value. It will be noted that if the relay 73 is energized after the exciter relay 65 operates, the control relay 88 is energized first to effect the synchronization of the synchronous machine 15 whereas if the relay 73 is deenergized the control relay 89 is energized first to effect the synchronization of the synchronous machine 17.

*Buses 1 and 2 energized and not tied together; and bus 3 deenergized*

Under the above-mentioned electric conditions of the buses, the deenergized bus 3 may be connected to the bus 4 while it is deenergized or the bus 3 may be disconnected from the bus 4 while the latter is deenergized or is energized either by the converter 22 or by some other source. The operation of the control equipment for the converter 14, however, is the same under all of these different electric conditions of the bus 4 because the sequence of operation of the control equipment is determined by the voltage relay 44 being in its deenergized position.

When the converter 14 is started under the above-mentioned electric conditions of the buses, it is accelerated to substantially synchronous speed in the manner heretofore described, and then the control relay 88 is energized in response to the closing of the contacts 132 of the relay 127 in the same manner as heretofore described, except that the energizing circuit of the control relay 88 includes the contacts 225 of the deenergized voltage relay 44 which are connected in parallel with the contacts 138 of the relay 73. The relay 88 then effects the operation of the motor operated rheostat 35 and the closing of the circuit breaker 16 to connect the synchronous machine 15 to the bus 1 in the same manner as when the converter 14 is started with the energized buses 3 and 4 connected together and the energized buses 1 and 2 disconnected from each other, except that the heretofore described energizing circuit for the closing coil of the circuit breaker 16 includes the contacts 226 of the deenergized voltage relay 44 which are connected in parallel with the contacts 161 of the relay 73.

The opening of the auxiliary contacts 121 on the circuit breaker 16, when it connects the synchronous machine 15 to the bus 1 under the assumed electric conditions of the buses, interrupts the heretofore described energizing circuit for the closing coil of the field switch 34, since the parallel connected contacts 122 of the voltage relay 44 are open. Therefore, the field switch 34 opens and disconnects the field winding 32 of the synchronous machine 17 from the exciter 19. The closing of the auxiliary contacts 227 on the field switch 34 completes an energizing circuit for the closing coil of the circuit breaker 18 so that the unexcited synchronous machine 17 is connected to the bus 3. The energizing circuit of the closing coil of the circuit breaker 18 is from the positive terminal of the battery B' to conductor 133 in the manner heretofore described, then through auxiliary contacts 228 on circuit breaker 16, conductor 229, contacts 230 of voltage relay 44, conductor 231, contacts 227 of field switch 34, conductor 188, closing coil of circuit breaker 18 to the negative terminal of battery B'. The closing of the auxiliary contacts 232 on the circuit breaker 18 completes an energizing circuit for the closing coil of the field switch 34 so that the field winding 32 is again excited. This energizing circuit is from the positive terminal of the battery B' to conductor 120 in the manner heretofore described, then through auxiliary contacts 232 on circuit breaker 18, conductor 123, closing coil of field switch 34 to the negative terminal of battery B'.

*Buses 1 and 2 energized and tied together; bus 3 deenergized; and no other converter in operation*

Under the above-mentioned electric conditions of the buses, the bus 3 may or may not be connected to the bus 4 while the latter is deenergized or the bus 4 may be energized by some other source than the converter 22 but disconnected from the bus 3. The operation of the control equipment for the converter 14, however, is the same under all of these electric conditions as the heretofore described operation thereof when the bus 3 is deenergized and the buses 1 and 2 are not tied together since during the starting operation of the converter 14 the voltage relay 44 is in its deenergized position.

*Buses 1 and 2 energized and tied together; bus 3 deenergized; and converter 22 in operation*

Under the above-mentioned electric conditions of the buses, the bus 3 is disconnected from the bus 4. Therefore, during the starting operation of the converter 14, the voltage relay 44 is in its deenergized position so that the converter 14 is accelerated to substantially synchronous speed in the manner heretofore described, and then the control relay 88 is energized in response to the closing of the contacts 132 of the relay 127 in the same manner as when the bus 3 is deenergized, the buses 1 and 2 are not tied together, and converter 22 is not in operation.

Since, however, both of the switches 6 and 9 are assumed to be closed, the relay 50 is deenergized during the starting operation of the converter 14. Also, the energizing circuit of the relay 73 remains completed through the contacts 77 of relay 46 during the starting operation of the converter 14 because both the contacts 43 of the synchronism check relay 42 and the contacts 98 of the energized voltage relay 45 are simultaneously open under the assumed conditions. Furthermore, as soon as the converter 14 has accelerated to approximately synchronous speed so that the exciter relay 65 is operated, the heretofore described circuit of the relay 61 is interrupted. The relay 61 then closes its contacts 235 and completes an energizing circuit for the control relay 70 through the contacts 236 of the deenergized relay 50. The opening of the contacts 159 of the relay 70 interrupts the heretofore described energizing circuit for the closing coil of the circuit breaker 16 through the contacts 155 of the automatic synchronizer 37.

When the relay 88 becomes energized during the starting operation of the converter 14, the closing of the contacts 140 and 141 of the relay 88 renders the frequency difference responsive means 36 operative in the manner heretofore described so that it controls the motor operated rheostat 35 in the proper manner to bring the synchronous machine 15 into synchronism with the bus 1 and so that the automatic synchronizer 37 closes its contacts 155 when a predetermined phase and frequency relationship is established between the voltages of the synchronous machine 15 and the bus 1. Also, the closing of the contacts 239 of the relay 88 completes an energizing circuit for the control relay 80 from the positive terminal of the battery B'' at the substation B through contacts 199 of relay 91, contacts 200 of relay 90, contacts 240 of relay 71, contacts 241 of relay 74, contact making device 83, pilot wire 202, contact making device 82, conductor 243, contacts 238 of relay 73, contacts 237 of relay 70, conductor 205, contacts 239 of relay 88, winding of relay 80 and condenser 86 in parallel, pilot wire 207, contacts 208 of relay 90, contacts 209 of relay 91 to the negative terminal of battery B''. The relay 80, therefore, can be energized only when the positions of the rotors of the converters 14 and 22 are such as to effect the simultaneous closing of the contacts of the contact making devices 82 and 83.

When the proper space relationship exists between the rotors of the two converters 14 and 22 so that the relay 80 is energized at the same time the contacts 155 of the automatic synchronizer 37 are closed, an energizing circuit is completed for the closing coil of the circuit breaker 16 so that the synchronous machine 15 is connected to the bus 1. This energizing circuit for the closing coil of the circuit breaker 16 is from the positive terminal of the battery B' to conductor 133 in the manner heretofore described, then through contacts 156 of relay 88, conductor 157, contacts 155 of automatic synchronizer 37, conductor 158, contacts 244 of relay 70, contacts 245 of relay 73, contacts 246 of relay 80, conductor 162, closing coil of circuit breaker 16 to the negative terminal of battery B'.

The opening of the auxiliary contacts 121 of the circuit breaker 16 effects the opening of the field switch 34, and then the circuit breaker 18 is closed to connect the unexcited synchronous machine 17 to the bus 3, and the field switch 34 is subsequently reclosed to excite the field winding 32 in the same manner as when the low frequency bus 3 is deenergized and the buses 1 and 2 are not tied together.

*Buses 1 and 2 energized and tied together; buses 3 and 4 energized and tied together; and converter 22 in operation*

During the starting operation of the converter 14 under the above-mentioned conditions of the buses, the control relay 73 becomes deenergized as soon as the exciter voltage relay 65 opens its contacts 75, and the relay 61 becomes deenergized and effects the energization of the control relay 70 as soon as the exciter voltage relay 65 opens its contacts 63. Therefore, the converter 14 is started, and the control relay 89 is energized to effect the closing of the circuit breaker 18 and the connection of the synchronous machine 17 to the bus 3 in the same manner as when the converter is started with the buses 1 and 2 not tied together, the buses 3 and 4 tied together, and the converter 22 is in operation.

The opening of the auxiliary contacts 166 of the circuit breaker 18 interrupts the energizing circuit of the control relay 89, and the closing of the contacts 136 of the relay 89 completes the heretofore described energizing circuit for the control relay 88 through the auxiliary contacts 134 on the open circuit breaker 16. Since the relay 70 is energized when the relay 88 becomes energized under the above-mentioned conditions, the closing of the contacts 220 of the relay 88 renders the phase responsive arrangement 95 operative to control the frame shifting motor 21 so as to establish a predetermined phase relation between the voltages of the synchronous machine 15 and the bus 1. If the voltage of the machine 15 leads the voltage of the bus 1 so that the contacts 96 of the phase responsive arrangement 95 are closed, an operating circuit is completed for the motor 21 to cause it to rotate the frame of the machine 15 in the proper direction to bring the voltages of the machine 15 and the bus 1 into phase. This operating circuit is from the positive terminal of the battery B' to the conductor 133 in the manner heretofore described, then through contacts 220 of relay 88, conductor 221, auxiliary contacts 248 on circuit breaker 18, contacts 249 of relay 73, conductor 250, contacts 251 of relay 70, conductor 252, auxiliary contacts 253 on circuit breaker 16, contacts 96 of phase responsive arrangement 95, field winding 254 and armature winding of motor 21 to the negative terminal of battery B'. If the voltage of the machine 15 lags the voltage of the bus 1 so that the contacts 97 of the phase responsive arrangement 95 are closed, an operating circuit is completed for the motor 21 to cause it to rotate the frame of the machine 15 in the opposite direction so as to bring the voltages of the machine 15 and the bus 1 into phase. This operating circuit is from the positive terminal of the battery B' to the contacts 253 on the circuit breaker 18 in the manner heretofore described, then through contacts 97 of the phase responsive arrangement 95, field winding 255 and armature winding of motor 21 to the negative terminal of battery B'.

When the voltages of the machine 15 and the bus 1 have been brought into substantially phase coincidence so that both of the contacts 98 and 99 of the phase responsive arrangement 95 are simultaneously closed, an energizing circuit is then completed for the closing coil of the circuit breaker 16 so that the synchronous machine 15 is connected to the bus 1. This energizing circuit is from the positive terminal of the battery B' to conductor 133 in the manner heretofore described, then through contacts 156 of relay 88, conductor 157, contacts 255 of relay 70, contacts 256 of relay 73, conductor 257, contacts 99 and 98 of phase responsive arrangement 95, conductor 162, closing coil of circuit breaker 16 to the negative terminal of battery B'.

The closing of the auxiliary contacts 228 on the circuit breaker 16 completes an energizing circuit for the frame shifting motor 21 so that it restores the frame of the machine 15 to its normal position and thereby causes the load to be equally divided between the two parallel connected converters 14 and 22. This restoring circuit for the motor 21 is from the positive terminal of the battery B' to conductor 133 in the manner heretofore described, then through auxiliary contacts 228 on circuit breaker 16, conductor 229, auxiliary contacts 260 on circuit breaker 18, conductor 261, off-normal frame shifting contacts 262 and field winding 255, or off-normal frame shifting contacts 263 and field winding 254, depending upon the position of the frame shifting mechanism, armature winding of motor 21 to the negative terminal of battery B'. When the frame shifting mechanism is restored to its normal position, this restoring circuit is interrupted at either the off-normal contacts 262 or 263.

*Buses 1 and 2 energized and tied together; buses 3 and 4 energized and tied together; and converter 22 not in operation*

Under the above-mentioned electric conditions of the buses, the relay 50 is deenergized, and the relays 61 and 73 are energized after the converter 14 has accelerated to approximately synchronous speed during the starting operation thereof. Therefore, during the starting operation of the converter 14, the synchronous machine 15 is synchronized with the bus 1 in the same manner as if the converter were being started with the buses 1 and 2 disconnected. However, after the circuit breaker 16 is closed to connect the synchronous machine 15 to the bus 1 and the control relay 89 is energized, the frequency difference responsive means 39 cannot control the prime mover governing motor 171 to vary the frequency of the bus 1 because the contacts 176 of the relay 50 are now open. Therefore, unless the synchronous machine 17 happens to be in synchronism with the bus 3 so that the contacts 183 of the automatic synchronizer 40 are closed, it is necessary for the operator at one of the substations to disconnect the buses 1 and 2 from each other before the control equipment at the substation A can complete the starting operation of the converter 14 by automatically closing the circuit breaker 18 and connecting the synchronous machine 17 to the bus 3. The control apparatus for the converter 14 is rendered inoperative to control the prime mover governing motor 171 under the above-mentioned electric conditions of the buses because it might be objectionable to change the load division of the prime mover driven generators at the two substations under these conditions.

*Buses 1 and 2 energized and tied together; buses 3 and 4 energized and not tied together; and converter 22 in operation*

Under the above-mentioned electric conditions of the buses, the synchronous machine 15 is synchronized during the starting operation of the converter 14 in the same manner as when the buses 1 and 2 are tied together, the converter 22 is in operation, and the bus 3 is deenergized. After the circuit breaker 16 is closed, however, the frequency difference responsive means 39 cannot control the prime mover governing motor 171 to vary the frequency of the bus 1 because the contacts 176 of the relay 50 are open. Therefore, unless the synchronous machine 17 happens to be in synchronism with the bus 1 so that the contacts 183 of the automatic synchronizer 40 are closed after the circuit breaker 16 closes, it is necessary for the operator at one of the substations to disconnect the buses 1 and 2 from each other before the control apparatus for the converter 14 can automatically close the circuit breaker 18 and thereby connect the synchronous machine 17 to the bus 3.

*Disconnection of converter 14*

The converter 14 can be taken out of service at any time by opening the switch 100 and effecting the deenergization of the master relay 57. The closing of the contacts 266 of relay 57 completes an energizing circuit for the trip coil 267 of the circuit breaker 16 through auxiliary contacts 268 on the circuit breaker 16 and conductor 269 and also an energizing circuit for the trip coil 270 of the circuit breaker 18 through the auxiliary contacts 271 on the circuit breaker 18 and conductor 269. The closing of the contacts 272 of the relay 57 connects the conductor 261 to the positive terminal of the battery B' so that a circuit is completed in the manner heretofore described for the frame shifting motor 21 in case the frame of the synchronous machine 15 is not in its normal position.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, two energized alternating current circuits of different frequencies, a synchronous frequency converter comprising two synchronous machines, one of which is connected to one of said circuits, and means controlled by the difference between the frequencies of the other of said machines and the other of said circuits for varying the frequency of one of said circuits to decrease said frequency difference.

2. In combination, two energized alternating current circuits of different frequencies, a synchronous frequency converter comprising two synchronous machines, means for connecting one of said machines to one of said circuits, and means responsive to the connection of said one of said machines to said one of said circuits under predetermined electric conditions of said circuits for varying the frequency of one of said circuits in response to the difference between the frequencies of the other of said machines and the circuit to which said one of said machines is not connected.

3. In combination, two alternating current circuits of different frequencies, a prime mover driven generator connected to one of said circuits, means for energizing the other circuit, a synchronous frequency converter comprising two synchronous machines, means for synchronizing one of said machines with one of said circuits, and means responsive to the completion of said synchronization for controlling the frequency of said prime mover driven generator in response to the difference between the frequencies of the other of said machines and the circuit to which said one of said machines is not synchronized.

4. In combination, two alternating current circuits of different frequencies, a prime mover driven generator connected to one of said circuits, means for energizing the other circuit, a synchronous frequency converter comprising two synchronous machines, means for synchronizing one of said machines with one of said circuits, means responsive to the completion of said synchronization for controlling the frequency of said prime mover driven generator in response to the difference between the frequencies of the other of said machines and the circuit to which said one of said machines is not synchronized, and automatic synchronizing means for connecting said other of said machines and said last mentioned circuit together.

5. In combination, two alternating current circuits of different frequencies, a synchronous frequency converter, means responsive to a predetermined electric condition of said circuits for sequentially connecting said converter to said circuits in a predetermined sequence, and means responsive to a different predetermined electric condition of said circuits for sequentially connecting said converter to said circuits in a different predetermined sequence.

6. In combination, two alternating current circuits of different frequencies, a synchronous frequency converter, means responsive to both of said circuits being energized while said converter is being started for effecting first the synchronization of said converter to a predetermined one of said circuits and then the synchronization of said converter with the other of said circuits, and means responsive to either of said circuits being energized and the other of said circuits being deenergized while said converter is being started for effecting first the synchronization of said converter to the energized circuit and then the connection of said converter to the deenergized circuit.

7. In combination, two alternating current circuits of different frequencies, a synchronous frequency converter comprising two synchronous machines, means responsive to both of said circuits being energized while said converter is being started for effecting first the synchronization of one of said machines to one of said circuits and then the variation in the frequency of one of said circuits in response to the frequency difference between the other of said machines and the circuit to which said one of said machines is not synchronized to effect the synchronization of the said other machine to the last mentioned circuit, and means responsive to said one of said circuits being energized and the other of said circuits being deenergized while said converter is being started for effecting first the synchronization of said one of said machines to said one of said circuits and then the connection of said other machine to the circuit to which said one of said machines is not connected while the field winding of said other machine is deenergized and then the energization of said field winding.

8. In combination, two alternating current circuits of a predetermined frequency, means for interconnecting said circuits, two alternating current circuits of a different predetermined frequency, means for interconnecting said last mentioned circuits, a synchronous converter interconnecting a predetermined one of said circuits of a predetermined frequency and a predetermined one of said circuits of a different predetermined frequency, a second synchronous frequency converter, and means responsive to different electric conditions of said circuits for sequentially connecting said second converter to the other of said circuits in different orders.

9. In combination, two alternating current circuits of a predetermined frequency, means for interconnecting said circuits, two alternating current circuits of a different predetermined frequency, means for interconnecting said last mentioned circuits, a synchronous converter interconnecting a predetermined one of said circuits of a predetermined frequency and a predetermined one of said circuits of a different predetermined frequency, a second synchronous frequency converter comprising a synchronous machine of said predetermined frequency and a second synchronous machine of said different predetermined frequency, means responsive to a predetermined electric condition of said circuits for effecting first the synchronization of said synchronous machine of said predetermined frequency with said other circuit of a predetermined frequency and then the synchronization of said second synchronous machine with said other circuit of a different predetermined frequency, and means responsive to a different predetermined electric condition of said circuits for effecting the synchronization of said synchronous machine in the reverse order.

10. In combination, a synchronous frequency converter interconnected between an electric circuit of a predetermined frequency and an electric circuit of a different predetermined frequency, a second electric circuit of said predetermined frequency, a second electric circuit of said different predetermined frequency, means for connecting said circuits of said predetermined frequency together, means for connecting said circuits of different predetermined frequency together, a second synchronous frequency converter, and means controlled by the electric conditions of said circuits for connecting said second converter between said second electric circuits in different sequences depending upon the electric conditions existing while said second converter is being placed in service.

11. In combination, a synchronous frequency converter interconnected between an electric circuit of a predetermined frequency and an electric circuit of a different predetermined frequency, a second electric circuit of said predetermined frequency, a second electric circuit of said different predetermined frequency, means for connecting said circuits of said predetermined frequency together, means for connecting said circuits of different predetermined frequency together, a second synchronous frequency converter, and means controlled by the electric conditions of said circuits for connecting said second converter first to said second electric circuit of said predetermined frequency and then to said second electric circuit of said different predetermined frequency whenever said circuits of said predetermined frequency are energized and connected together and for connecting said second converter first to said second electric circuit of said different predetermined frequency and then to said second electric circuit of said predetermined frequency when said last mentioned circuit is not energized while said second converter is being placed in service.

12. In combination, a synchronous frequency converter interconnected between an electric circuit of a predetermined frequency and an electric circuit of a lower predetermined frequency, a second electric circuit of said predetermined frequency, a second electric circuit of said lower predetermined frequency, means for interconnecting said circuits of said predetermined frequency, means for interconnecting said circuits of said lower predetermined frequency, a second synchronous frequency converter, and means controlled by the electric conditions of said circuits for connecting said second converter first to said second electric circuit of said lower predetermined frequency and then to said second electric circuit of said predetermined frequency whenever both of said circuits of said lower frequency are energized and connected together and for connecting said second converter first to said second circuit of said predetermined frequency and then to said second circuit of said lower predetermined frequency when said last mentioned circuit is not energized while said second converter is being placed in service.

13. In combination, a synchronous frequency converter interconnected between an electric circuit of a predetermined frequency and an electric circuit of a lower predetermined frequency, a second electric circuit of said predetermined frequency, a second electric circuit of said lower predetermined frequency, means for interconnecting said circuits of said predetermined frequency, means for interconnecting said circuits of said lower predetermined frequency, a second synchronous frequency converter comprising a synchronous machine of said predetermined frequency and a synchronous machine of said lower predetermined frequency, and means controlled by the electric conditions of said circuits for first synchronizing said synchronous machine of said lower predetermined frequency to said second circuit of said lower predetermined frequency and then synchronizing said synchronous machine of said predetermined frequency to said second circuit of said predetermined frequency whenever both of said circuits of said lower predetermined frequency are energized and connected together and for first synchronizing said synchronous machine of said predetermined frequency to said second circuit of said predetermined frequency and then connecting said synchronous machine of said lower predetermined frequency to said second circuit of said lower predetermined frequency when said last mentioned circuit is deenergized while said second converter is being placed in service.

14. In combination, a synchronous frequency converter interconnected between an electric circuit of a predetermined frequency and an electric circuit of a different predetermined frequency, a second electric circuit of said predetermined frequency, a second electric circuit of said different predetermined frequency, a second synchronous frequency converter, means responsive to a predetermined space relationship between the rotors of said converters for controlling the connection of said second converter to said second electric circuit of said predetermined frequency, means responsive to a different space relationship between the rotors of said converter for controlling the connection of said second converter to said second electric circuit of said different predetermined frequency, and means controlled by the electric conditions of said circuits for selectively controlling the operation of said connecting means.

15. In combination, a synchronous frequency converter interconnected between an electric circuit of a predetermined frequency and an electric circuit of a different predetermined frequency, a second electric circuit of said predetermined frequency, a second electric circuit of said different predetermined frequency, a second synchronous frequency converter, means responsive to a predetermined space relationship between the rotors of said converters for controlling the connection of said second converter to said second electric circuit of said predetermined frequency, means responsive to a different space relationship between the rotors of said converters for controlling the connection of said second converter to said second electric circuit of said different predetermined frequency, and means controlled by the electric conditions of said circuits for effecting the operation of said first mentioned space relationship responsive means whenever said electric circuits of said predetermined frequency are in synchronism and for effecting the operation of said second mentioned space relationship responsive means when only said electric circuits of said different predetermined frequency are in synchronism.

16. In combination, a synchronous frequency converter interconnected between an electric circuit of a predetermined frequency and an electric circuit of a higher predetermined frequency, a second electric circuit of said predetermined frequency, a second electric circuit of said higher predetermined frequency, a second synchronous frequency converter, means responsive to a predetermined space relationship between the rotors of said converters for controlling the connection of said second converter to said second electric circuit of said predetermined frequency, means responsive to a different space relationship between the rotors of said converter for controlling the connection of said second converter to said second electric circuit of said higher predetermined frequency, and means controlled by the electric conditions of said circuits for effecting the operation of said first mentioned space relationship responsive means whenever said electric circuits of said predetermined frequency are in synchronism and for effecting the operation of said second mentioned space relationship responsive means when only said electric circuits of said higher predetermined frequency are in synchronism.

17. In combination, an alternating current circuit of a predetermined frequency, a second alternating current circuit of a different predetermined frequency, a synchronous frequency converter interconnected between said circuits and having a frame shifting mechanism, means for maintaining said frame shifting mechanism in a predetermined position while said converter is in operation, a second frequency converter having a frame shifting mechanism, means for interconnecting said second frequency converter between said circuits including means for varying said last mentioned frame shifting mechanism from a predetermined position corresponding to said predetermined position of said first mentioned frame shifting mechanism, and means responsive to the interconnection of said second converter between said circuits for restoring said second frame shifting mechanism to its predetermined position.

18. In combination, an alternating current circuit of a predetermined frequency, a second alternating current circuit of a different predetermined frequency, a synchronous frequency converter interconnected between said circuits, frame shifting mechanism associated with said converter, means for maintaining said mechanism in a predetermined position while said converter is in operation, a second frequency converter having a frame shifting mechanism, means for synchronizing said converter with one of said circuits, means for synchronizing said converter with the other of said circuits including means for varying the position of the frame shifting mechanism of said second converter, and means responsive to the interconnection of said second converter between said circuits for restoring the frame shifting mechanism of said second converter to a predetermined position corresponding to said predetermined position of said first mentioned frame shifting mechanism.

19. In combination, an electric circuit of predetermined frequency, a second electric circuit of a different predetermined frequency, two frequency converters, means for interconnecting one of said converters between said circuits, and means controlled by predetermined electrical conditions of said converters for connecting the other of said converters to said circuits in a predetermined sequence when said one of said converters is interconnected between said circuits and for connecting said other of said converters to said circuits in the reverse sequence when said one of said converters is not interconnected between said circuits.

20. In combination, an electric circuit of predetermined frequency, a second electric circuit of a different predetermined frequency, two frequency converters for interconnecting between said circuits, automatic starting and synchronizing means for said converters including means responsive to a predetermined space relationship between the rotors of said converters, and means dependent upon whether one of the said converters is already in operation and interconnecting the two circuits for selecting the said means responsive to the space relationship between the two rotors for controlling the connection of the converter which is being started to one of the electric circuits.

HERMAN BANY.